No. 859,700. PATENTED JULY 9, 1907.
H. M. SMITH.
FISHING TOOL FOR OIL AND ARTESIAN WELLS.
APPLICATION FILED APR. 15, 1907.
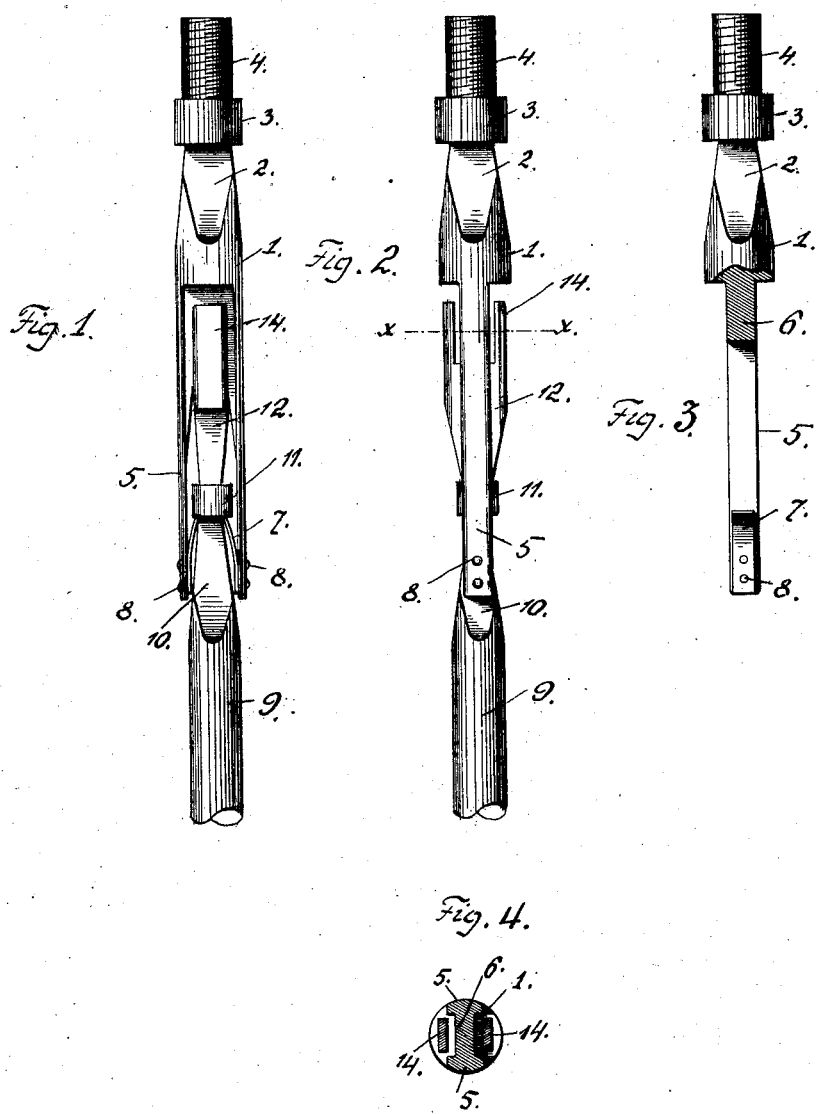
WITNESSES:
A. H. Rabsag,
INVENTOR
Herbert M. Smith
By H. C. Everett & Co.,
Attorneys

UNITED STATES PATENT OFFICE.

HERBERT M. SMITH, OF McMINN, PENNSYLVANIA.

FISHING-TOOL FOR OIL AND ARTESIAN WELLS.

No. 859,700.     Specification of Letters Patent.     Patented July 9, 1907.

Application filed April 15, 1907. Serial No. 368,392.

*To all whom it may concern:*

Be it known that I, HERBERT M. SMITH, a citizen of the United States of America, residing at McMinn, in the county of Allegheny and State of Pennsylvania, have invented certain new and useful Improvements in Fishing-Tools for Oil and Artesian Wells, of which the following is a specification, reference being had therein to the accompanying drawing.

This invention relates to fishing tools for oil and Artesian wells, and the invention has for its object to provide a simple and inexpensive tool having positive and reliable means for gripping a tool or object in a well.

My improved fishing tool is particularly designed for gripping and raising pump rods, the sections of which have accidentally become disconnected within a well. In connection with my improved fishing tool, I construct the same whereby the tool will engage a pump rod and permit of said rod being rotated, the tool serving in this capacity as a spanner wrench.

The detail construction of my improved fishing tool will be hereinafter more fully described and then specifically pointed out in the appended claims, and referring to the drawing forming part of this specification, like numerals of reference designate corresponding parts throughout the several views, in which:—

Figure 1 is a front elevation of the fishing tool as engaging the upper end of a pump rod, Fig. 2 is a side elevation of the same, Fig. 3 is a vertical sectional view partly in elevation of the fishing tool, Fig. 4 is a cross sectional view taken on the line x—x of Fig. 2.

To put my invention into practice, I construct my improved tool of a body portion 1 having a tapering end 2, provided with a collar 3 and a threaded shank 4, the threaded shank 4 being employed for connecting the tool to a suitable rod or rope socket.

The body portion 1 is provided with depending diametrically opposed arms 5, said arms at their upper ends being connected together by a web 6. The lower ends of the arms are provided with inwardly projecting resilient clips 7, which are secured to the lower ends of the arms, as at 8.

In connection with the fishing tool, I have illustrated the upper end of a pump rod 9, which is generally contracted as at 10, and provided with a collar 11, said collar carrying a head 12 bifurcated to form arms 14, said arms being employed for securing the rod 9 to another rod, said rods constituting the means by which a pump is operated in the well. On account of the vibratory stresses and strains to which the pump rods are subjected, the sections often become separated and considerable trouble is experienced in removing the section of the rod that remains in the well.

By employing my improved fishing tool, the pump rod remaining in the well can be easily gripped and removed therefrom. This is accomplished by lowering the fishing tool down over the head 12, the web 16 engaging between the arms 14 of said head, while the clips 7 ride over the collar 11 and engage underneath said collar. The pump rod can then be easily removed by hoisting upwardly upon the fishing tool, the rod 9 being prevented from rotating by the web 6 engaging between the arms 14. After the pump rod has been removed from a well, a suitable instrument can be used for releasing the clip 7 from engagement with the collar 11 whereby the fishing tool can be withdrawn from the upper end of the pump rod.

My improved fishing tool is constructed of strong and durable metal, and is employed for removing from a well any drills and bits that are provided with collars or heads, under which the clips can engage.

What I claim and desire to secure by Letters Patent, is:—

1. A fishing tool embodying a body portion, having a tapering end, a collar carried thereby, a threaded shank above said collar, depending diametrically opposed arms carried by said body portion, a web connecting the upper ends of said arms, and resilient clips secured to the lower ends of said arms.

2. A fishing tool consisting of a body portion, depending diametrically opposed arms, a web connecting the upper ends of said arms, and resilient clips carried by the lower ends of said arms.

In testimony whereof I affix my signature in the presence of two witnesses.

HERBERT M. SMITH.

Witnesses:
   HENRY W. DE LONG,
   ALBERT WEIR.